(12) United States Patent
Fritz

(10) Patent No.: US 8,016,568 B2
(45) Date of Patent: Sep. 13, 2011

(54) WIND TURBINE BLADE

(75) Inventor: Peter James Fritz, Greenville, SC (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 12/239,465

(22) Filed: Sep. 26, 2008

(65) Prior Publication Data

US 2010/0080709 A1   Apr. 1, 2010

(51) Int. Cl.
 *F01D 5/14* (2006.01)
(52) U.S. Cl. ........................................ 416/235; 416/243
(58) Field of Classification Search .................. 416/235, 416/236, 231 R, 231 B, 242, 243, 914
See application file for complete search history.

(56) References Cited

U.S. PATENT DOCUMENTS

| | | | | |
|---|---|---|---|---|
| 1,366,635 A | * | 1/1921 | Conway | 416/236 R |
| 2,562,227 A | * | 7/1951 | Zobel | 244/35 R |
| 4,789,306 A | * | 12/1988 | Vorus et al. | 416/223 R |

* cited by examiner

*Primary Examiner* — Edward Look
*Assistant Examiner* — Dwayne J White
(74) *Attorney, Agent, or Firm* — Cantor Colburn LLP

(57) ABSTRACT

Disclosed is a blade including a blade body including a leading edge and a trailing edge, and at least one trailing edge cavity defined by a blade area disposed in at least partial alignment with the trailing edge, the at least one cavity extending a desired depth into said blade body in a direction of the leading edge.

13 Claims, 6 Drawing Sheets

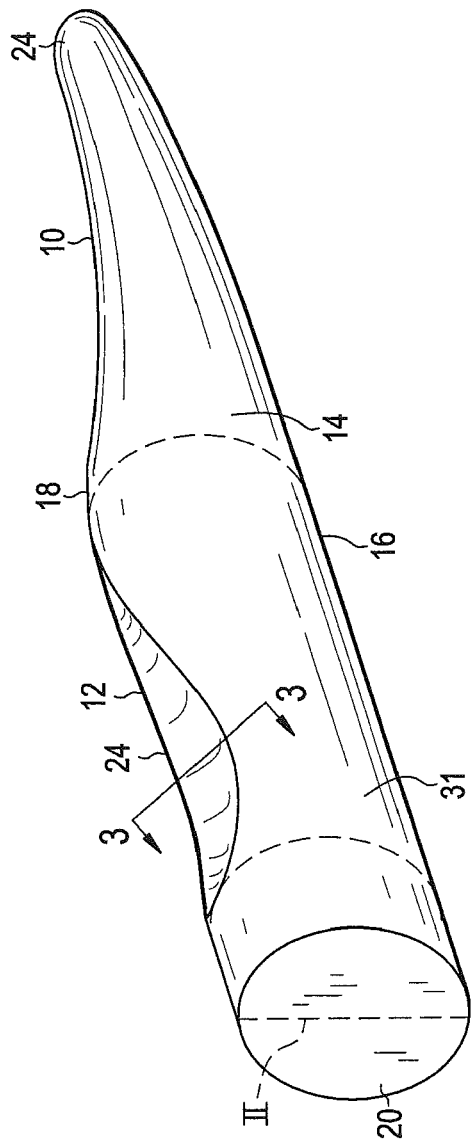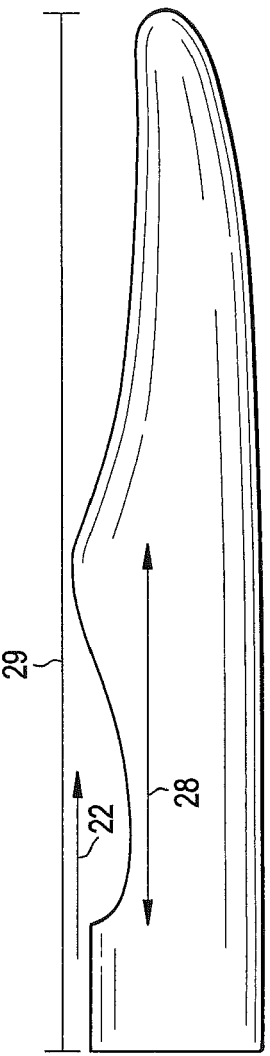

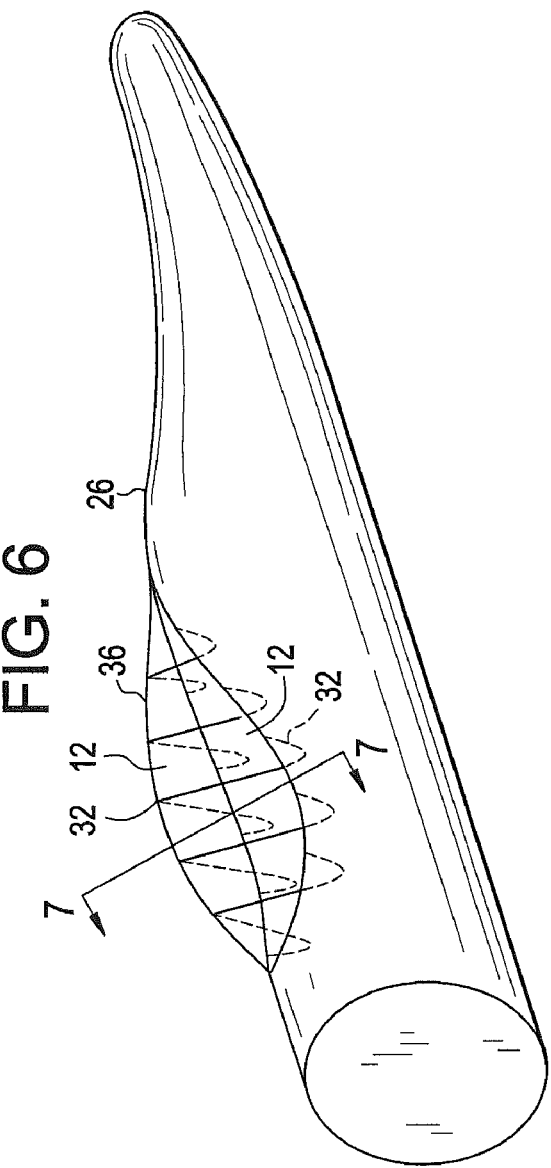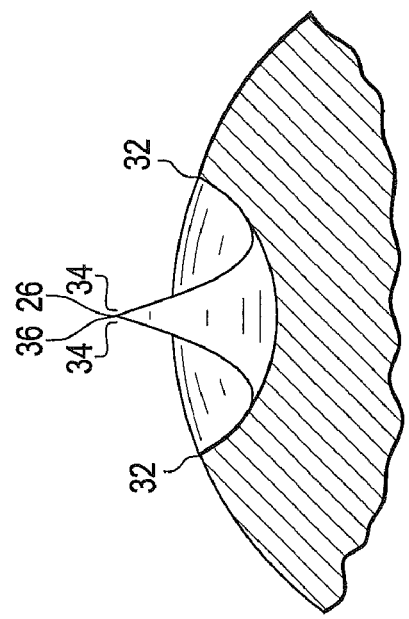

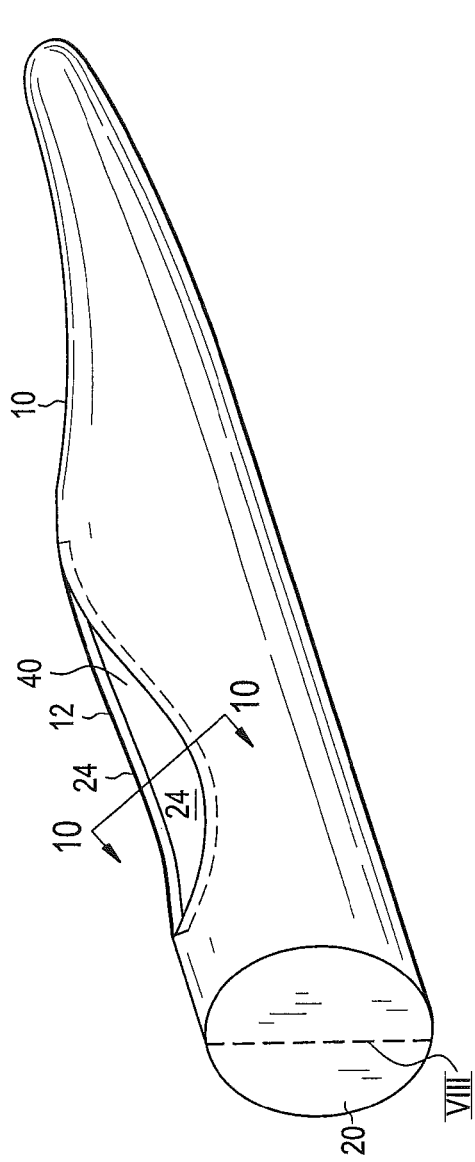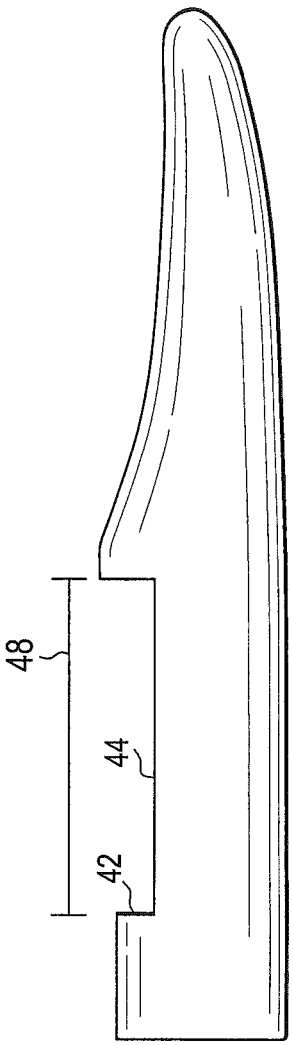

WIND TURBINE BLADE

FIELD OF THE INVENTION

The disclosure relates generally to a wind turbine blade, and more particularly to a trailing edge geometry of a wind turbine blade.

BACKGROUND OF THE INVENTION

Wind turbine blades can be manufactured to include a large width or airfoil chord length. Larger and wider blades can be more efficient, but the excess width makes it difficult to form the blade into a cylinder at the root connection. Chord length distance can be truncated by removal of a part or all of the trailing edge of a blade. Typically, this truncation is performed via a straight "chop" or a small fillet to the trailing edge, leading to one or more convex or flat areas. Unfortunately, flat or convex truncation of this kind can lead to difficulties in manufacturing a wind turbine blade.

Accordingly, a blade geometry that could reduce chord length while reducing difficulty of blade manufacture and maintaining blade strength would be desirable.

BRIEF DESCRIPTION OF THE INVENTION

Disclosed is a blade including a blade body including a leading edge and a trailing edge, and at least one trailing edge cavity defined by a blade area disposed in at least partial alignment with the trailing edge, the at least one cavity extending a desired depth into said blade body in a direction of the leading edge.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a perspective view of an exemplary embodiment of a wind turbine blade;

FIG. 2 is a cross sectional slice of the blade of FIG. 1 taken along phantom line II;

FIG. 6 is a perspective view of another exemplary embodiment of a wind turbine blade;

FIG. 7 is a partial cross sectional elevation view of the blade of FIG. 6 taken along 7-7.

FIG. 8 is a perspective view of another exemplary embodiment of a wind turbine blade;

FIG. 9 is a cross sectional slice of the blade of FIG. 8 taken along phantom line VIII;

Figure 3:
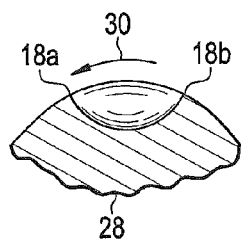
FIG. 3 is a partial cross sectional elevation view of the blade of FIG. 1 taken along 3-3.

The detailed description explains embodiments of the invention, together with advantages and features, by way of example with reference to the drawings.

DETAILED DESCRIPTION OF THE INVENTION

Referring to FIGS. 1-14, a wind turbine blade 10 including a trailing edge cavity 12 is illustrated. In the exemplary embodiment of FIGS. 1-4, the cavity is a concavity 12 including a curved surface or surface. As shown in these FIGS. 1-4, the blade 10 is defined by a blade body 14, which includes a leading edge 16, trailing edge 18, a root end 20, and a tip end 22. The concavity 12 is defined by an area 24 disposed along the trailing edge 18. As is shown best in FIG. 4, this area 24, and thus the concavity 12 the area 24 defines, is disposed along the trailing edge 18 in such a way that it interrupts a seam line 26 or relative apex of the trailing edge 18. Disposal of the concavity 12 along the trailing edge 18 in this manner effectively creates two trailing edges 18a and 18b (which are best illustrated in FIG. 3) within the area 24, which (during blade operation) allows for separation of eddy currents from both sides of the blade 10, resulting in reduced drag and higher turbine output efficiency.

Figure 4:
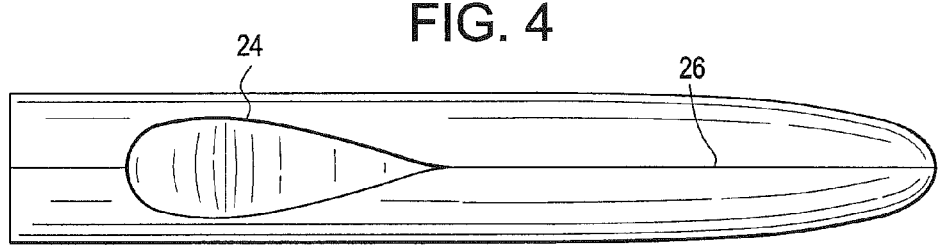
FIG. 4 is a planar view of the wind turbine blade of FIG. 1.

As is shown in FIGS. 1-3, the concavity 12 includes a curvature 28 that extends into the blade body 14 in a direction of the leading edge 16. As is best shown in FIG. 2, this curvature 28 may be configured to extend in a longitudinal direction 27 relative to a longitudinal extent 29 of the blade body 14. That is, the curvature 28 of the region of concavity starts, curves to its maximum depth, and terminates along a length of the blade body 14. As is best shown in FIG. 3, the curvature 28 may also be configured to extend in a circumferential direction 30 relative to a circumferential area 31 of the blade body 14. That is, the curvature 28 of the region of concavity starts, curves to its maximum depth, and terminates along a circumference of the circumferential area 31 of the blade body 14. Of course, as is best shown in FIG. 1, the concavity 12 may also include curvatures 28 are disposed to curve in both directions discussed above.

Figure 5:
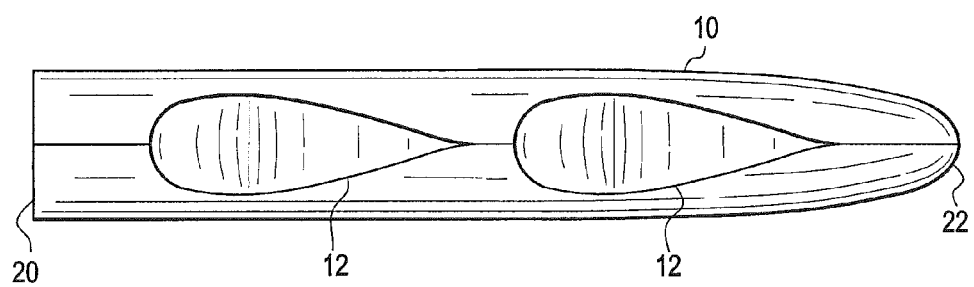
FIG. 5 is a planar view of the wind turbine blade including multiple regions of concavity or depression.

As is also shown in FIGS. 1-4, the concavity 12 is disposed between the root end 20 and tip end 22 of the blade 10. Though it is not illustrated, it should be appreciated that longitudinal extents of the concavity 12 may extend from the root end 20 to the tip end 22. It should also be appreciated that, in exemplary embodiment, a depth of the concavity 12 will extend from 0.2 mm to 2500 mm for a blade up to 100 m in span. Additionally, as shown in FIG. 5, there may be multiple concavities 12 that are distinct from each other, and aligned end to end along the trailing edge 16 between the root end 20 and tip end 22.

Referring now to FIGS. 6 and 7, the blade 10 may also include multiple concavities 12 aligned longitudinally parallel to each other. Each of the concavities 12 includes opposing exterior edges 32 and interior edges 34. The interior edges 34 meet at a point of adjacency 36. In the exemplary embodiment of FIGS. 6 and 7 (an as is best shown in FIG. 7), the point of 36 is linearly continuous with the seam line 26 of the trailing edge 16. As is additionally evident from the exemplary embodiment of FIG. 7, the point of adjacency 36 (which consists of the two inner edges 34 of the concavities 12) extends a greater distance away from the leading edge 16 than does the exterior edges 32. In a further exemplary embodiment, the area of adjacency protrudes at least 10 mm, for a blade up to 100 m span, further than the exterior edges 32. It should be appreciated that although the exterior edges 32 and area of adjacency 36 may be configured to protrude at any desired distance from the leading edge 16 relative to each other, the exemplary embodiment described above (i.e., wherein the adjacency 36 protrudes further than the exterior edges 32) acts as a tail or trailing edge extender to the blade 10, which (in use) reduces drag via further separation of eddy currents.

Figure 10:
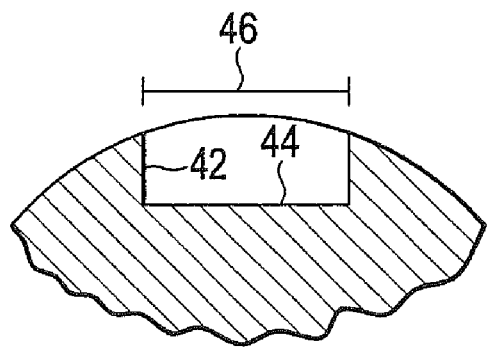
FIG. 10 is a partial cross sectional elevation view of the blade of FIG. 8 taken along 10-10.

Referring now to FIG. 8-10, the blade 10 the cavity is shown as a depression 40. Like the concavity 12 of FIGS. 1-4, the depression 40 is defined by the area 24, which is disposed along the trailing edge 18. Again, similarly to the concavity 12, the depression 40, is disposed along the trailing edge 18 in such a way that it interrupts a seam line 26 or relative apex of the trailing edge 18. The only substantial difference between the depression 40 and the concavity 12 is that the depression 40 achieves a depth into the blade 10 via depression walls 42 that are not continuously curved into contact with a deepest extent of the depression 40. In other words, the depression 40 is defined by depression walls 42 that terminate at a depression surface 44 (i.e. the deepest extent) at distinct, non-curved junction 48.

As is shown in FIGS. 8-10, the depression 40, like the curvature 12, extends into the blade body 14 in a direction of the leading edge 16. Referring to FIG. 9, the depression surface 44 may be depressed into the body 14 such that the surface 44 includes a width 46 relative to the depression 40. Referring to FIG. 10, the depression surface 44 may also be depressed into the body 14 such that the surface 44 includes a length 48 relative to the depression 40. Additionally, the depression 40 may include a consistent depth from the trailing edge 18 across a length and width of the depression 40.

Figure 11:
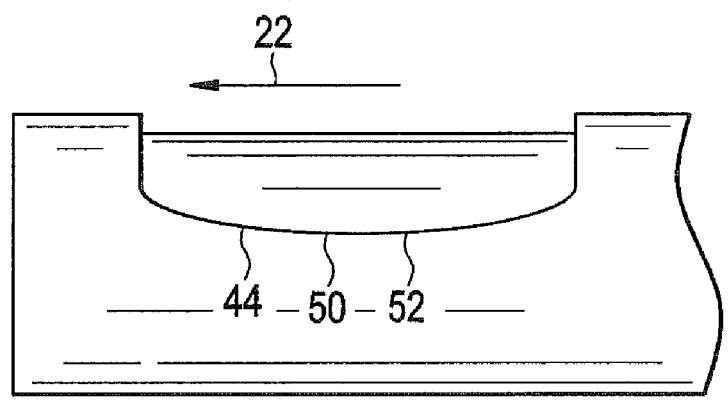
FIG. 11 is a partial cross sectional view of another embodiment of a wind turbine blade.
Figure 12:
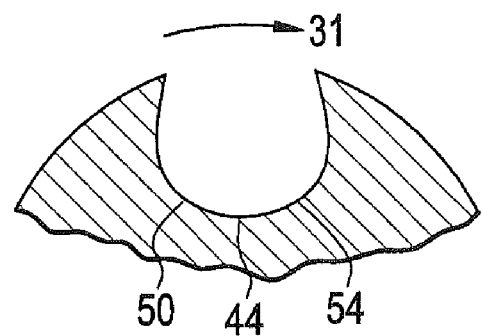
FIG. 12 is a partial cross sectional view of another embodiment of a wind turbine blade.

Referring to FIGS. 11 and 12, the depression surface 44 may also itself include a concavity 50, wherein said concavity 50 includes a curvature 52 that extends in the longitudinal direction 27 relative to the longitudinal extent 29 of the blade body 18, and/or a curvature 54 that extends in a circumferential direction 30 relative to a circumferential area 31 of the blade body 14. In addition, it should be appreciated that the depression wall may include any concavity or convexity relative to a vector between a relative outer extent of the walls 42 and the depression surface 44.

Figure 13:
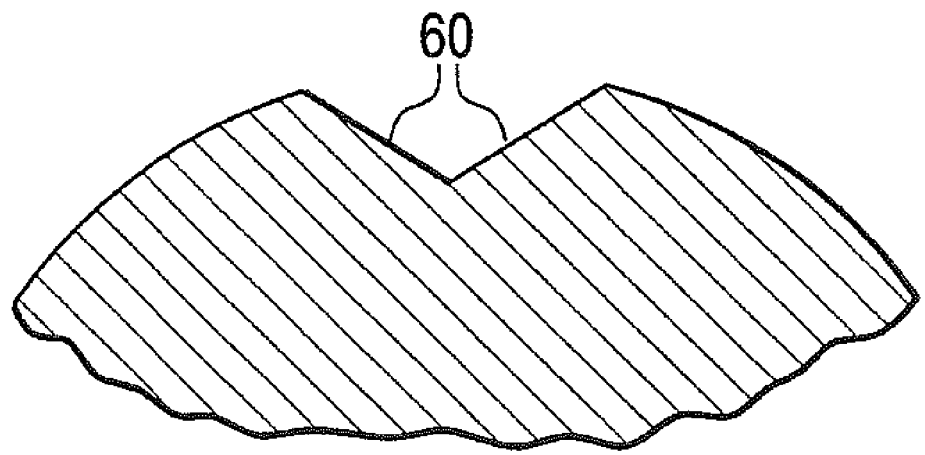
FIG. 13 is a partial cross sectional elevation view of another exemplary embodiment of a wind turbine blade.
Figure 14:
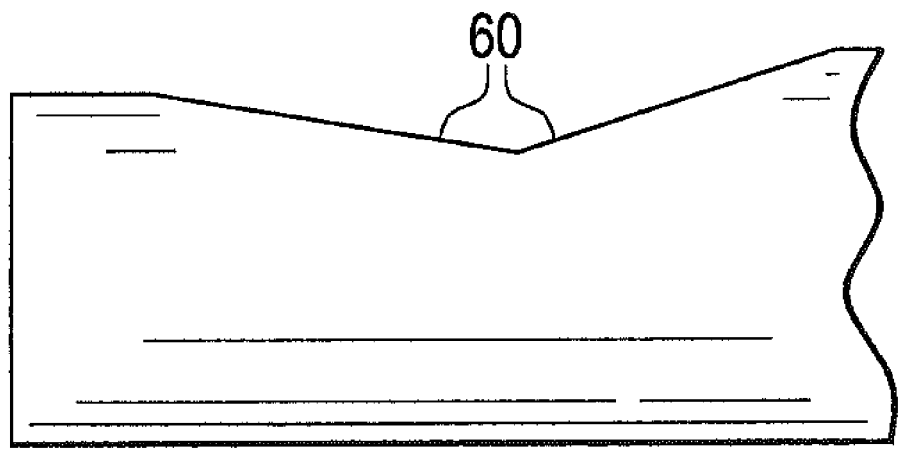
FIG. 14 is a cross sectional slice of another embodiment of a wind turbine blade.

Referring now to FIGS. 13 and 14, the trailing edge cavity 12 may also be triangular in shape. That is the cavity may extend into the body 14 of the blade 10 via a relatively upside down triangle (upside down relative to the Figures). As is shown in FIG. 13, the triangle shape is defined by two sloping surfaces 60 sloping along the length 48 of the cavity 12. As is shown in FIG. 14, the triangle shape is defined by two sloping surfaces 60 sloping along the width 48 of the cavity 12.

It should be appreciated that the depression and triangular embodiments of FIGS. 8-14 may be configured to include the depths, and multiple disposals along the blade 10, that are discussed relative to the concavity embodiments of FIGS. 1-6. In addition, it should be appreciated that all of the embodiments of FIGS. 1-14 may include concavities of cylindrical, spherical, elliptical or like contours.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade comprising:
    a blade body including a leading edge and a trailing edge, said trailing edge being disposed at an edge area of said blade body that is thinner than a thickest area of said blade body; and
    at least one trailing edge cavity defined by a blade area disposed in at least partial alignment with said trailing edge in proximity to said edge area, said at least one cavity extending a desired depth into said blade body in a direction of said leading edge,
    wherein said at least one cavity is a concavity that is concave into said blade body in a direction of said leading edge, and
    wherein said concavity includes a curvature that extends in a circumferential direction relative to a circumferential area of said blade body.

2. The blade of claim 1, wherein said concavity includes a curvature that extends in a longitudinal direction relative to a longitudinal extent of said blade body.

3. The blade of claim 1, wherein said concavity includes a curvature that extends in a longitudinal direction relative to a longitudinal extent of said blade body and a curvature that extends in a circumferential direction relative to a circumferential area of said blade body.

4. The blade of claim 1, wherein said trailing edge includes a seam line that is interrupted by said at least one cavity.

5. The blade of claim 1, wherein said at least one cavity is disposed between a root end and a tip end of said blade body.

6. The blade of claim 1, wherein said at least one cavity is multiple cavities that are each distinct from each other, and are disposed between a root end and a tip end of said blade body.

7. The blade of claim 1, wherein said at least one cavity is triangular in shape, said triangular shape being defined by at least two sloping surfaces sloping along a length of said at least one cavity.

8. The blade of claim 1, wherein said at least one cavity is triangular in shape, said triangular shape being defined by at least two sloping surfaces sloping along a width of said at least one cavity.

9. A blade comprising:
    a blade body including a leading edge and a trailing edge, said trailing edge being disposed at an edge area of said blade body that is thinner than a thickest area of said blade body; and
    at least one trailing edge cavity defined by a blade area disposed in at least partial alignment with said trailing edge in proximity to said edge area, said at least one cavity extending a desired depth into said blade body in a direction of said leading edge,
    wherein said at least one cavity is at least one depression including a depressed surface that is disposed to include at least one of a length and width relative to said trailing edge, and
    wherein said at least one depression includes a depression surface disposed at a depth into said blade body, said depth surface including a concavity into said blade body in a direction of said leading edge, said concavity including at least one of a curvature that extends in a longitudinal direction relative to a longitudinal extent of said blade body and a curvature that extends in a circumferential direction relative to a circumferential area of said blade body.

10. The blade of claim 9, wherein said at least one depression includes a consistent depth across a length of said at least one depression.

11. The blade of claim 9, wherein said at least one depression includes a consistent depth from said trailing edge across a width of said at least one depression.

12. The blade of claim 9, wherein said at least one depression is disposed orthogonally to a chord of said blade body, and wherein said at least one depression is disposed orthogonally to at least a portion of a longitudinal extent of said blade body.

13. A blade comprising:
   a blade body including a leading edge and a trailing edge, said trailing edge being disposed at an edge area of said blade body that is thinner than a thickest area of said blade body; and
   at least one trailing edge cavity defined by a blade area disposed in at least partial alignment with said trailing edge in proximity to said edge area, said at least one cavity extending a desired depth into said blade body in a direction of said leading edge,
   wherein said at least one cavity is two cavities disposed longitudinally parallel to each other, said two cavities adjoining at a seam line of said trailing edge, and
   wherein interior edges of said cavities are disposed along said seam line, and extend a greater distance away from said leading edge than opposing exterior edges of said regions of concavity.

* * * * *